United States Patent
Chan et al.

[11] Patent Number: 5,117,791
[45] Date of Patent: Jun. 2, 1992

[54] THROTTLE ACTUATOR SAFETY METHOD FOR AUTOMATED TRANSMISSION

[75] Inventors: Kwok W. Chan, Chorley, England; William F. Coté, Windermere, Fla.; Louis E. Miller, Livonia, Mich.

[73] Assignee: Eaton Corporation, Cleveland, Ohio

[21] Appl. No.: 676,508

[22] Filed: May 8, 1991

Related U.S. Application Data

[62] Division of Ser. No. 451,392, Dec. 15, 1989, Pat. No. 5,048,481.

[51] Int. Cl.⁵ ............................................. F02D 41/22
[52] U.S. Cl. .................................... 123/333; 123/397; 123/399
[58] Field of Search ............... 123/397, 399, 333, 332, 123/198 DB, 198 D; 73/118.1

[56] References Cited

U.S. PATENT DOCUMENTS

| | | | |
|---|---|---|---|
| 4,305,359 | 12/1981 | Mann et al. | 123/399 |
| 4,488,527 | 12/1984 | Pfalzgraf et al. | 123/399 |
| 4,519,360 | 5/1985 | Murakami | 123/399 |
| 4,603,675 | 8/1986 | Junginger et al. | 123/399 |
| 4,854,283 | 8/1989 | Kiyono et al. | 123/399 |

Primary Examiner—Andrew M. Dolinar
Attorney, Agent, or Firm—C. H. Grace

[57] ABSTRACT

A safety method is provided for use with control systems for vehicles such as trucks, and in particular for electromechanical controls (10) that assist the driver in shifting the gears (12), operating the clutch (16), and in actuating the throttle (22, 24, 26) by remote control. The method, which is for use in a vehicle's throttle-actuator subsystem (26A), utilizes a transmission control processor (42A) and a throttle control processor (42B). The method ascertains whether, when the driver of the vehicle removes his foot from the accelerator pedal (24A), control of the fuel pump (26C) returns to the idle governor as it should. The flow of fuel is stopped if it does not return properly. Also, a method is provided that monitors the throttle actuator (26A) to insure that it accurately follows throttle commands such as the position of the accelerator pedal (24A).

3 Claims, 7 Drawing Sheets

THROTTLE ACTUATOR SAFETY METHOD FOR AUTOMATED TRANSMISSION

This is a divisional application under 37 CFR 1,60, of Ser. No. 07/451,392, filed 12/15/89, now U.S. Pat. No. 5,048,481 entitled "Throttle Actuator Safety Method for automated Transmission", of inventors Kwok Wah Chan, William F. Cote' and Louis E. Miller.

FIELD

This invention relates to control systems for vehicles such as trucks, and in particular for electromechanical controls that assist the driver in shifting the gears, operating the clutch, and actuating the throttle by remote control.

BACKGROUND OF THE INVENTION

Automatic transmissions of both the automatic mechanical type utilizing Positive clutches and the planetary gear type utilizing frictional clutches are well known in the prior art, as are control systems for them.

Electronic control systems utilizing discrete logic circuits and/or software-controlled microprocessors for automatic transmissions in which gear selection and shift decisions are based upon certain measured and/or calculated parameters are also known. The parameters include vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like. Examples of such automatic and semi-automatic transmission control systems for vehicles are in U.S. Pat. Nos. 4,361,060, 4,551,802, 4,527,447, 4,493,228, 4,425,620, 4,463,427, 4,081,065, 4,073,203, 4,253,348, 4,038,889, 4,226,295, 3,776,048, 4,208,929, 4,039,061, 3,974,720, 3,478,851 and 3,942,393, all of which are incorporated by reference.

Automatic control systems for controlling the engagement and disengagement of master clutches in vehicles having automated manual transmissions (AMT) are known in the prior art, as may be seen in U.S. Pat. Nos. 4,792,901, 4,493,228, 4,081,065, 4,401,200, 4,413,714, 4,432,445, 4,509,625 and 4,576,263, all of which are incorporated by reference. An example of a control system for adjusting fuel in view of throttle setting is in U.S. Pat. No. 4,493,228, which is incorporated by reference.

SUMMARY OF THE INVENTION

An object of the invention is to provide a safety method for a vehicle's throttle actuator subsystem that ascertains whether, when the driver removes his foot from the accelerator pedal, control of the fuel pump returns to the idle governor as it should, and that stops the flow of fuel if it does not.

Another object is to provide a method that monitors a throttle actuator to insure that it accurately follows throttle commands such as the position of the accelerator pedal.

DESCRIPTION OF THE PREFERRED EMBODIMENT

Figure 1:
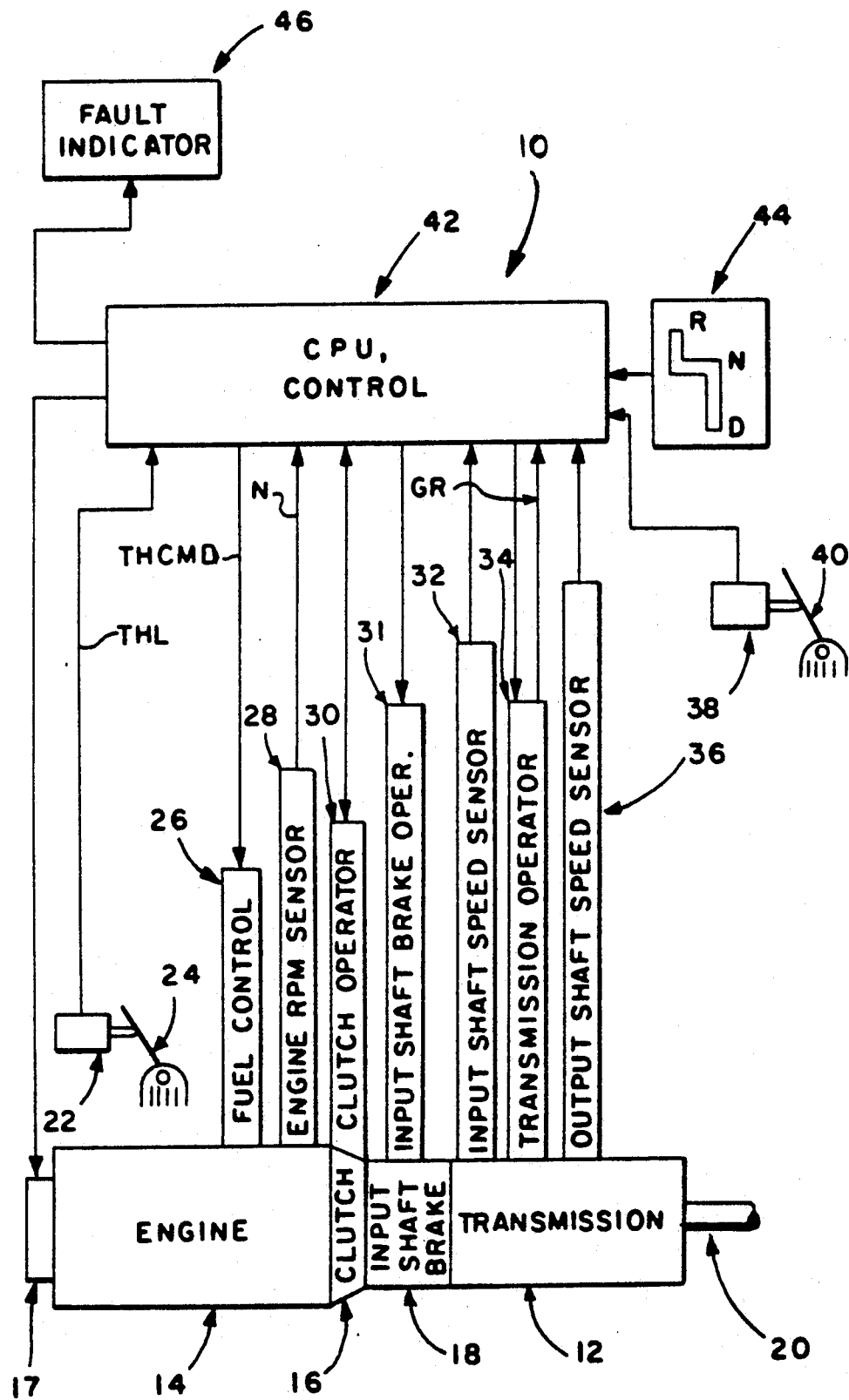
FIG. 1 is a simplified block diagram of an Automated Manual Transmission (AMT) for a vehicle.

Automated Manual Transmission. FIG. 1

To provide an example of the invention, the manner in which it is used in a specific AMT is described. The major components and connections of the AMT are shown in FIG. 1. It schematically illustrates an AMT system 10 including an automatic multi-speed compound change gear transmission 12 driven by a throttle-controlled engine 14, such as a diesel engine, through a master clutch 16.

An engine brake, such as an exhaust brake 17 for retarding the rotational speed of engine 14 and/or an input shaft brake 18, which is effective to apply a retarding force to the input shaft upon disengagement of master clutch 16, may be provided, as is known in the prior art. The output of automatic transmission 12 is an output shaft 20 which is adapted for driving connection to an appropriate vehicle component such as the differential of a drive axle, a transfer case or the like.

These power train components are acted upon and monitored by several devices. They include a throttle position monitor assembly 22, which senses the position of the vehicle's throttle and provides signals accordingly; a fuel control device 26 for controlling the amount of fuel to be supplied to engine 14; an engine speed sensor 28, which senses the rotational speed of the engine; a clutch operator and sensor 30, which engages and disengages the clutch 16 and supplies information as to the status of the clutch; an input brake operator 31; a transmission input shaft speed sensor 32; a transmission operator 34, which is effective to shift the transmission 12 into a selected gear ratio and to provide a signal indicative of current transmission status; and a transmission output shaft speed sensor 36.

A vehicle brake monitor 38 senses actuation of the vehicle's brake pedal 40. Alternatively, the engaged gear ratio of transmission 12 may be calculated by comparing the input shaft speed signal 32 with the output shaft speed signal 36.

These devices supply information to and accept commands from a Central Processing Unit (CPU) 42, which controls the AMT. The CPU 42 may include analog and/or digital electronic calculation and logic circuitry, whose specific configuration and structure are not part of the present invention. The CPU 42 also receives information from a shift control assembly 44 by which the vehicle operator may select a reverse (R), neutral (N), or forward drive (D) mode of operation of the vehicle.

An electrical power source (not shown) and a source of pressurized fluid (not shown) provide electrical and Pneumatic power to the various sensing, operating and processing units. A fault indicator or alarm device 46 may display the identity of a specific fault or simply signal the existence of an unidentified fault. Drive train components and controls therefor of the type described above are known in the prior art and are explained in greater detail in the above-mentioned U.S. Pat. Nos. 4,361,060; 3,776,048; 4,038,889 and 4,226,295.

Sensors 22, 28, 32, 36, 38 and 44 may be of any known type or construction for generating analog or digital signals indicative of the parameters monitored. Similarly, operators 17, 31, 26, 30 and 34 may be of any known electrical, pneumatic or electropneumatic type for executing operations in response to command signals from the CPU 42.

Fuel control device 26 normally supplies fuel to the engine 14 in accordance with the operator's setting of throttle 24 but may, to synchronize the transmission during an upshift or downshift or to Provide a smooth start, supply a greater or smaller amount of fuel in response to commands from the CPU 42.

The purpose of the CPU 42 is to select, in accordance with a Program (i.e. predetermined logic rules) and current or stored parameters, the optimal gear ratio at which the transmission should be operating and, if necessary, to command a gear change (shift), into the selected optimal gear ratio based upon the current and stored information.

The various functions to be performed by the CPU 42 and a preferred manner of performing them may be seen in more detail in U.S. Pat. No. 4,595,986 and in Society of Automotive Engineers (SAE) Paper No. 831,776 published in November 1983, which are incorporated by reference.

The clutch operator 30 is preferably controlled by the CPU 42 to engage and disengage the master clutch 16 as described in above-mentioned U.S. Pat. No. 4,081,065. The transmission 12 may include synchronizing means, such as an accelerator and/or a brake mechanism as described in U.S. Pat. No. 3,478,851, incorporated by reference. The transmission 12 is Preferably, but not necessarily, of the twin countershaft type as described in U.S. Pat. No. 3,105,395, incorporated by reference.

Figure 2:
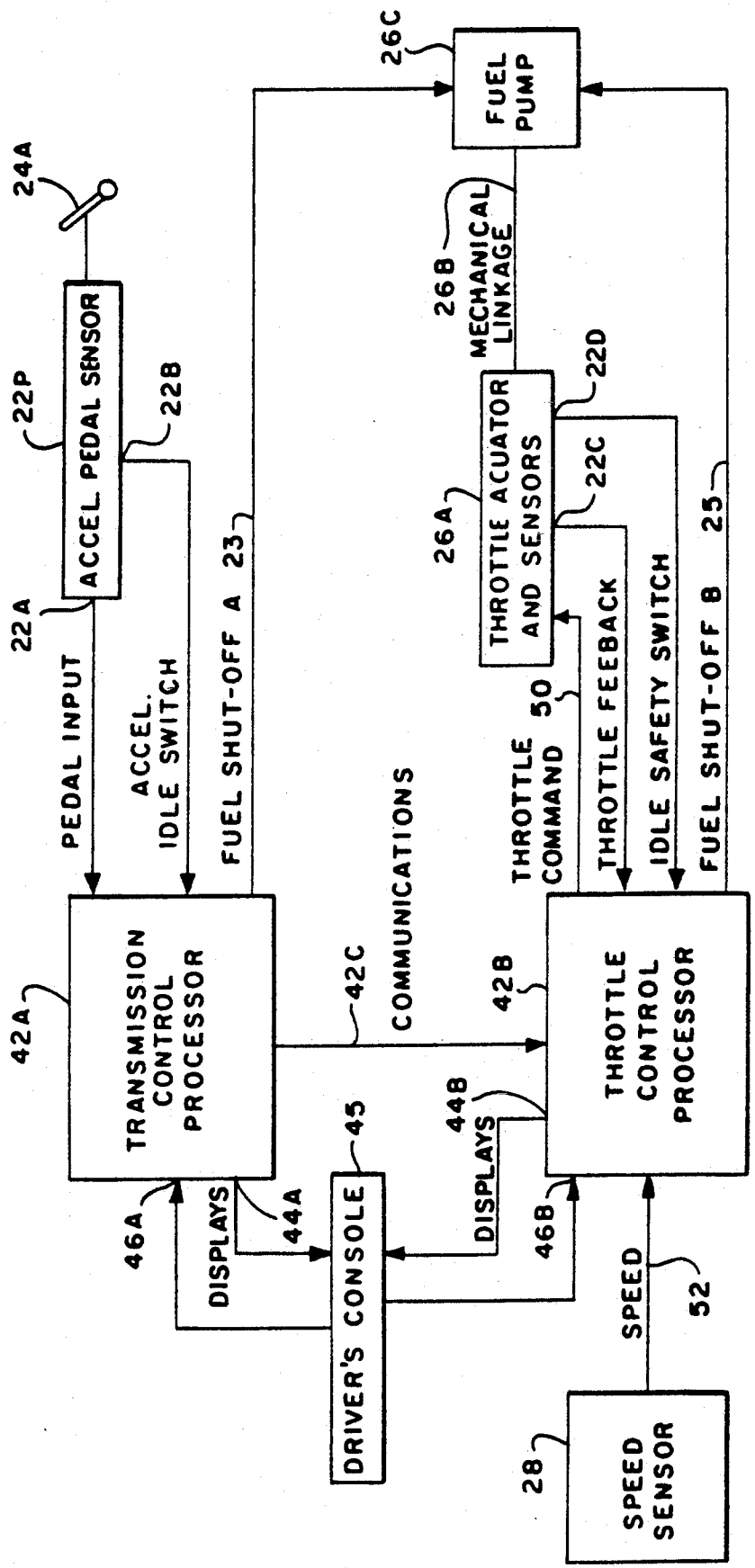
FIG. 2 is simplified block diagram of a preferred embodiment of the throttle actuator safety subsystem.

Throttle Actuator Safety Subsystem. FIG. 2

This section describes components and interconnections involved in the throttle actuator safety subsystem.

The Central Processor Unit (CPU) 42 in this embodiment utilizes two processors, each performing different operations, to accomplish all of the information-processing functions of the AMT system. One of them is a transmission control processor 42A, which performs the system-level processing; the other is a throttle control processor 42B, which performs some of the real-time input and output operations.

Each of the processors 42A, 42B, acting alone is capable of shutting off the fuel flow to the engine 14 if necessary, by acting on a fuel pump 26C. As shown on FIG. 2, there is a connection 23 called "fuel shut-off A" from the transmission control Processor 42A to the fuel pump 26C. There is also a connection 25 called "fuel shut-off B", from the throttle control processor 42B to the fuel pump 26C.

The transmission control processor 42A receives from an accelerator pedal sensor 22P a linear signal (terminal 22A) indicating the position of the accelerator 24A. The accelerator pedal sensor 22P also sends an accelerator idle switch signal (terminal 22B) to the transmission control Processor 42A indicating whether or not the accelerator 24A is in the idle position.

The throttle control processor 42B sends throttle commands on a line 50 to a throttle actuator 26A. The throttle actuator 26A is part of the fuel control device 26 of FIG. 1. The throttle actuator 26A sends linear throttle feedback information (terminal 22C) indicating the throttle actuator's position back to the throttle control processor 42B. The throttle actuator 26A also sends a (throttle) idle switch safety signal (terminal 22D) back to the throttle control processor 42B, indicating whether or not the throttle actuator is in the idle position.

A driver console 45 sends commands (terminal 46A) to the transmission control processor 42A and (terminal 46B) to the throttle control Processor 42B. The driver console 45, which includes the fault indicator 46 of FIG. 1, receives display information (terminal 44A) from the transmission control processor 42A and (terminal 44B) from the throttle control processor 42B.

The throttle control processor 42B also receives engine speed information on a line 52 from the engine speed sensor 28.

Neither the transmission control Processor 42A nor the throttle control processor 42B, when isolated from the other, has complete information on the state of the fuel system. Therefore, it is necessary for normal fuel control that the two processors communicate with each other. An interprocessor communication subsystem, symbolized by line 42C, is provided for this purpose.

Within the interprocessor communication subsystem 42C each Processor 42A, 42B, has several ways to determine whether communications between processors have broken down. Breakdown of communications may be partial or complete. In the event that communications do break down, each processor independently attempts to insure that the throttle actuator 26A is held in a safe state. The method for doing that is one of the subjects of this invention.

During normal operation the transmission control processor 42A informs the throttle control processor 42B via the communications lines 42C how much fuel the transmission control processor 42A is requesting; this is a throttle command. (The throttle control processor 42B then forwards a throttle command on line 50 to the throttle actuator 26A.) The throttle control processor 42B sends information to the transmission control processor 42A (throttle feedback), as to the monitored actual position of the throttle actuator 26A. Both of these values are scaled betweeen 0 and 100%.

Figure 3A:
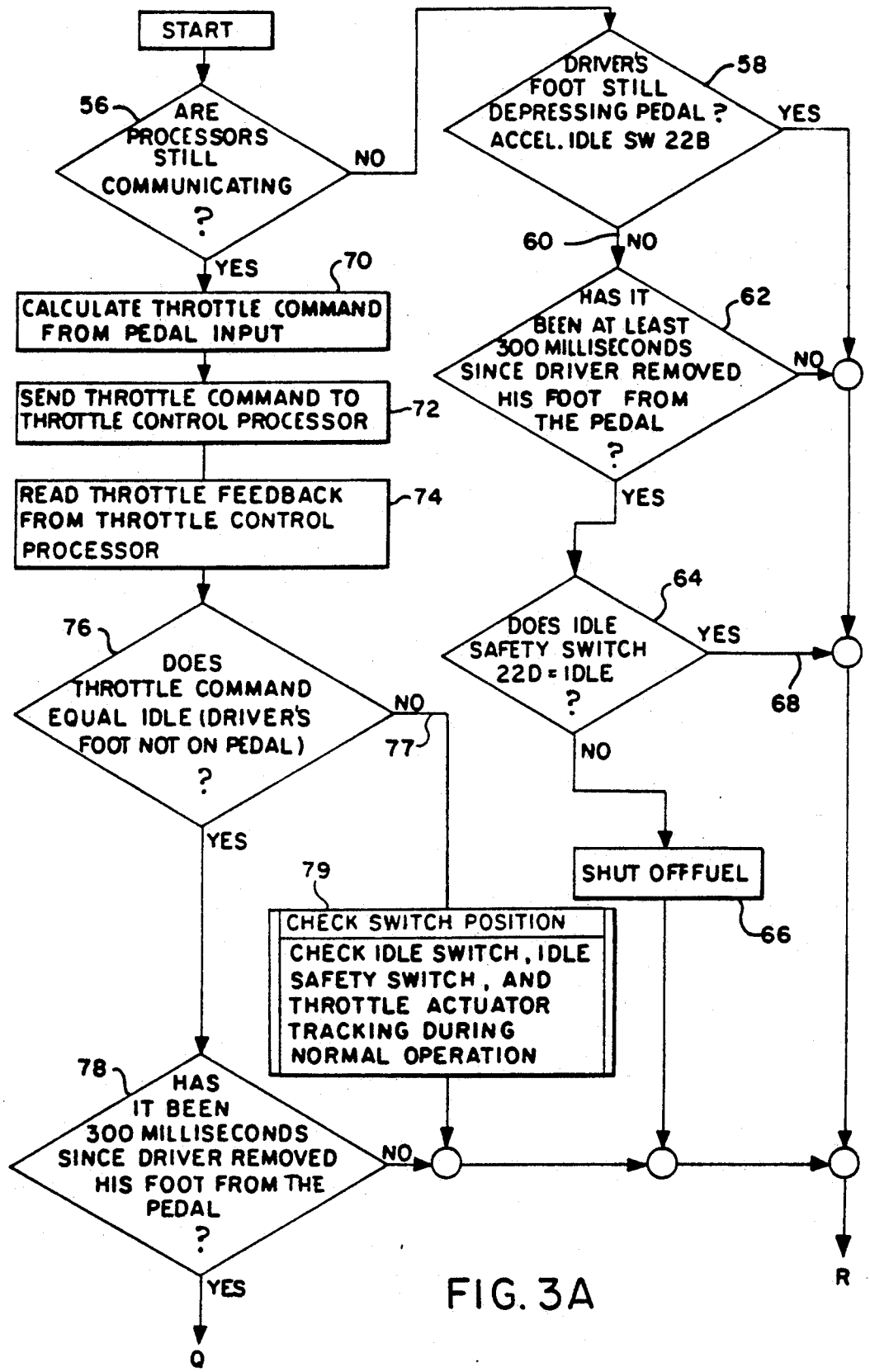
FIG. 3A is a chart of a first group of method steps performed by the transmission control processor.
Figure 3B:
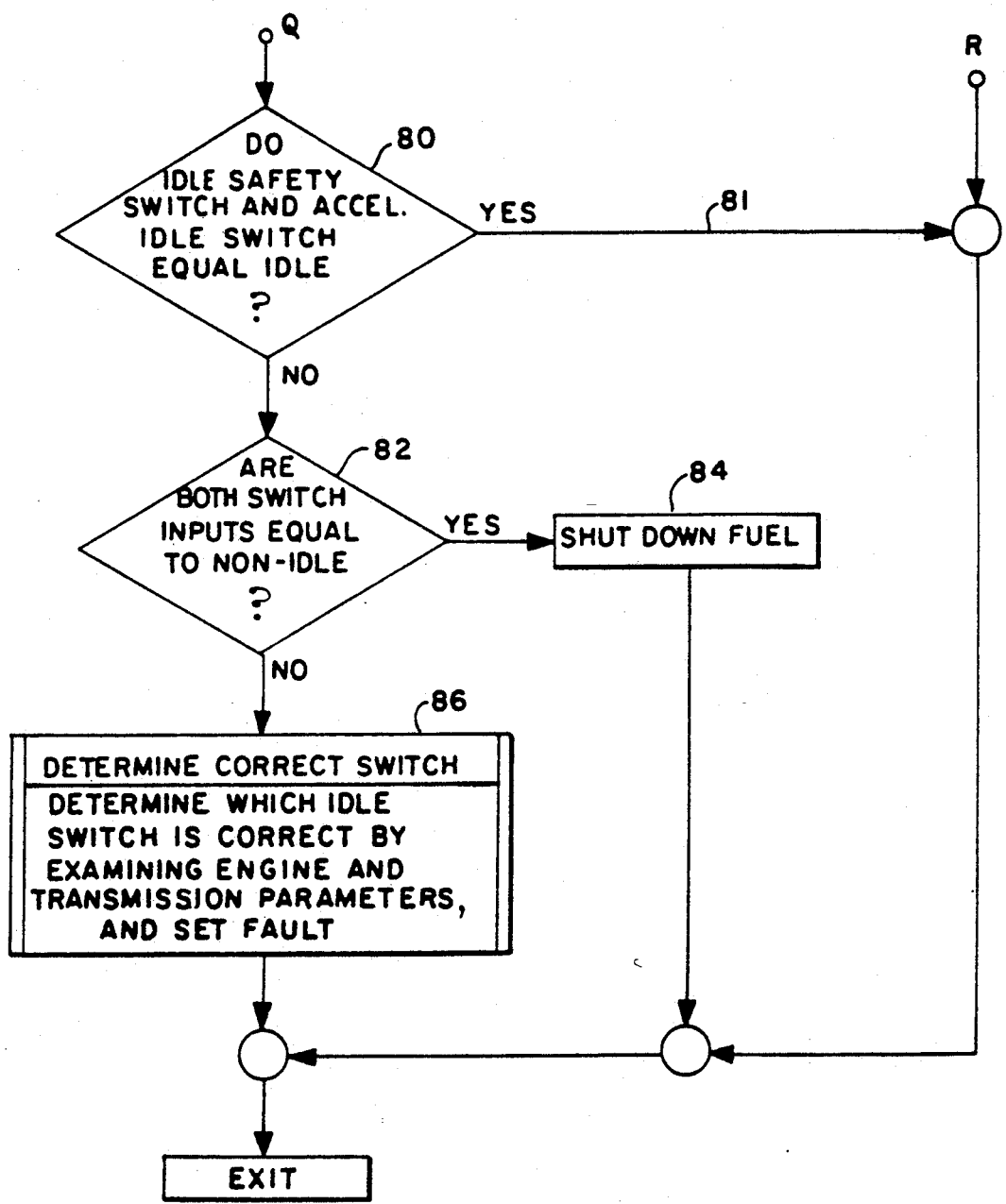
FIG. 3B is a continuation of FIG. 3A, showing a second group of method steps performed by the transmission control processor.

Transmission Control Processor. FIGS. 3A and 3B

This section describes method steps Performed by the transmission control processor 42A in Performing those of its functions that relate to the throttle actuator safety subsystem. The accompanying diagram is arbitrarily divided into FIGS. 3A and 3B for convenience of drawing it.

Upon a failure of communications between the two processors 42A, 42B, the transmission control processor 42A still has accurate driver command information (22A, 46A) but only partial information on the state of the throttle actuator 26A. See block 56 of FIG. 3A. The processors 42A, 42B monitor themselves in respect of routine communications capability, in any of many ways that are well-known in computer art. For example, they can detect absence of periodic monitoring signals of Predetermined Proper format when the signals do not occur at the expected times or in expected format. The transmission control processor 42A does not take any safety action when communication with the throttle control processor 42B is impaired as long as the driver's foot continues to depress the accelerator pedal 24A (block 58), as indicated by the accelerator idle switch 22B.

When the driver commands the fuel flow to an idle (22B) by releasing the pedal (line 60), a 300-millisecond delay is provided (block 62). Then the idle safety switch signal (22D) is automatically examined (block 64). If the idle safety switch signal does not indicate an idle condition after 300 milliseconds, the fuel pump 26C is turned off (block 66). On the other hand, if the idle safety switch signal 22D does indicate an idle condition after the 300-millisecond delay (68), no remedial action is taken by the transmission control Processor 42A.

Even when the interprocessor communication subsystem 42C is functioning properly, the transmission control Processor 42A Performs some of the Processing required to insure safe operation of the throttle actuator 26A. An important safety aspect relating to the operation of the throttle actuator 26A is to insure that when the driver removes his foot from the Pedal 24 the throttle actuator 26A in fact returns to idle. The transmission control processor 42A, not the throttle control processor 42B, monitors this aspect, as will now be described.

As shown in the left column of FIG. 3A, when the processors 42A, 42B are communicating properly, the transmission control Processor 42A calculates a throttle command (block 70) on the basis of the pedal input 22A. The throttle command is transmitted (72) to the throttle control processor 42B, and the throttle feedback signal (22C), is passed back (74) from the throttle control processor 42B to the transmission control processor 42A. The throttle command and the throttle feedback are compared in block 76.

When the driver commands (24) a zero-Percent throttle setting (idle), a 300-millisecond delay is initiated (78) to give the throttle actuator 26A enough time to return to the idle position. At the end of that delay:

(a) If both idle switch feedback signals (accelerator idle switch 22B and idle safety switch 22D) indicate an idle condition, it is inferred that the throttle actuator 26C is obeying its commands (block 80 of FIG. 3B); all is well (81) and no corrective action is taken.

(b) If neither of the switches 22B or 22D indicates idle (block 82), a fault is declared and the fuel to the engine is shut off (block 84).

(c) If one of the mechanisms indicates idle and the other does not, the system automatically makes further tests before acting (block 86), as described in a section below headed "When Feedback Signals Are Contradictory".

Figure 6:
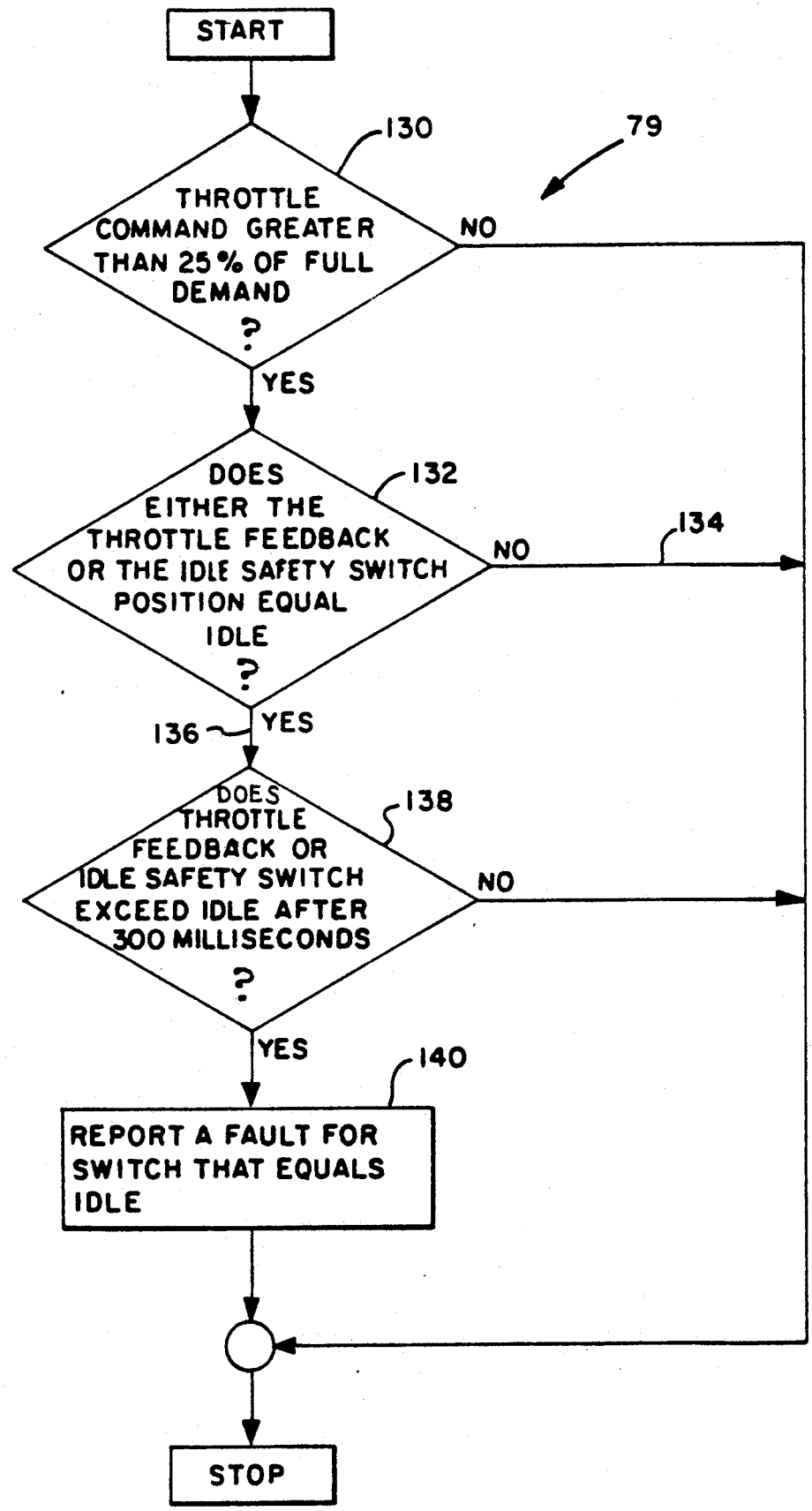
FIG. 6 is a chart of steps for monitoring the correctness of signals from feedback devices.

When the driver commands (24) a non-zero percent throttle setting (77), a procedure (79) is employed called "Verifying Compliance With Throttle Commands", which is described below and in FIG. 6.

Figure 4:
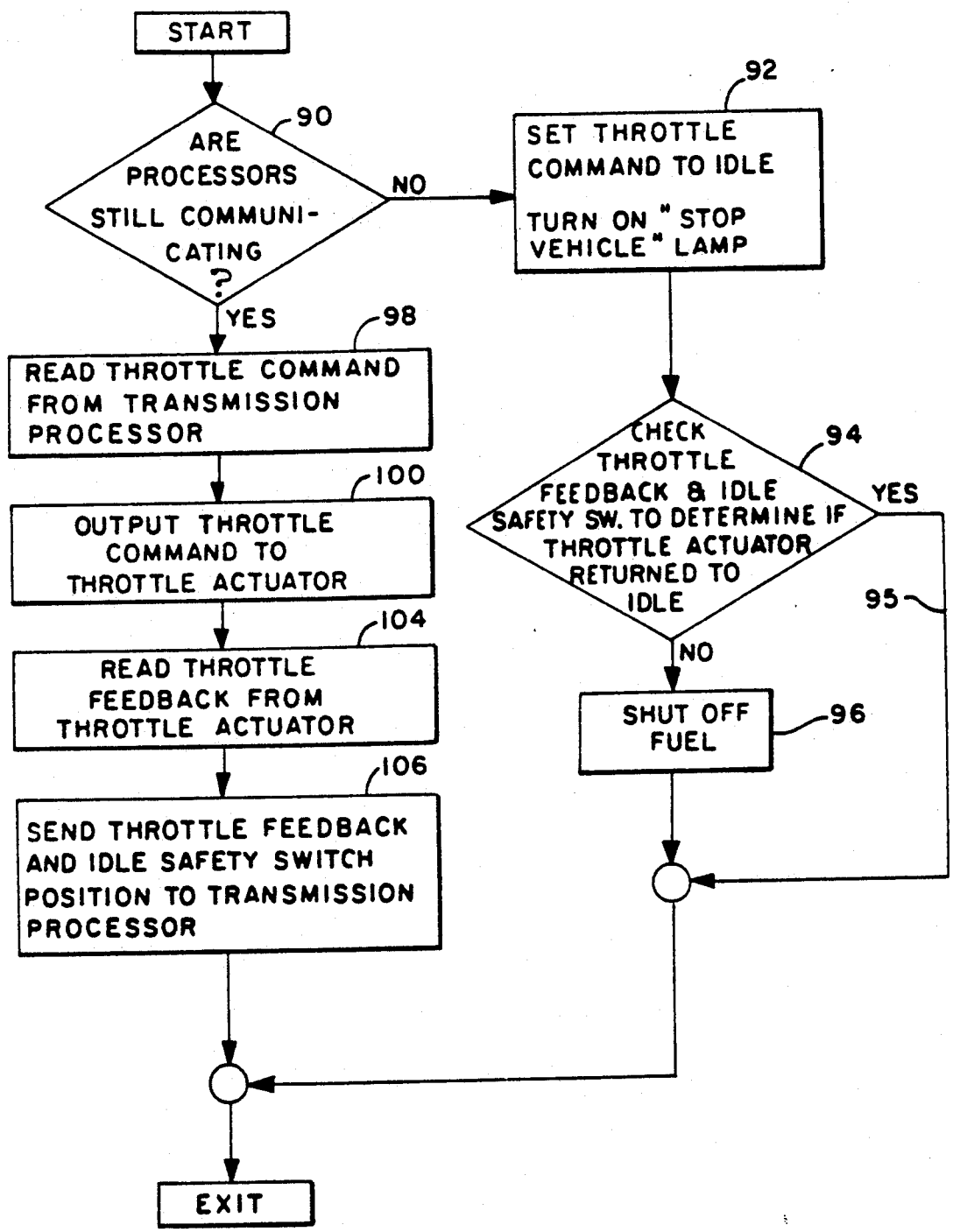
FIG. 4 is a chart of steps performed by the throttle control processor.

Throttle Control Processor, FIG. 4

Some of the critical real-time input/output operations that are performed by the throttle control processor 42B during normal fault-free operation are: (a) collection of wheel-speed sensor data 28; (b) closed-loop control of the throttle actuator 26A; and (c) interfacing (44B, 46B) with the driver's command console 45. See FIG. 2.

As shown in FIG. 4, upon loss of communication 42C between processors, the throttle control processor 42B uses a different approach (block 90) than does the transmission control Processor 42A. The throttle control processor 42B no longer has any information regarding the level of fueling being requested (22A) by the driver. Therefore, for safety, it attempts to drive the throttle actuator 26A back to idle position (block 92), and it turns on a "stop vehicle" indicator lamp on the driver's command console 45.

Thereafter, if the throttle control processor 42B receives verification (block 94) that the throttle actuator 26A has returned to idle position (both the linear feedback signal 22C and the idle safety switch's signal 22D indicate that the throttle actuator is at idle) then no further safety action is taken (95). If verification of a return to idle is not received, the flow of fuel to the fuel pump is shut off (96).

FIG. 4 also shows how the throttle control processor 42B passes throttle signals back and forth between the throttle actuator 26A and the transmission control processor 42A. The throttle control processor 42B reads (block 98) throttle commands that it receives via communication system 42C from the transmission control processor 42A. These commands are forwarded (block 100) to the throttle actuator 26C. Throttle feedback signals 22C from the throttle actuator 26C are received (block 104) by the throttle control processor 42B and forwarded (106) to the transmission control processor 42A.

Figure 5:
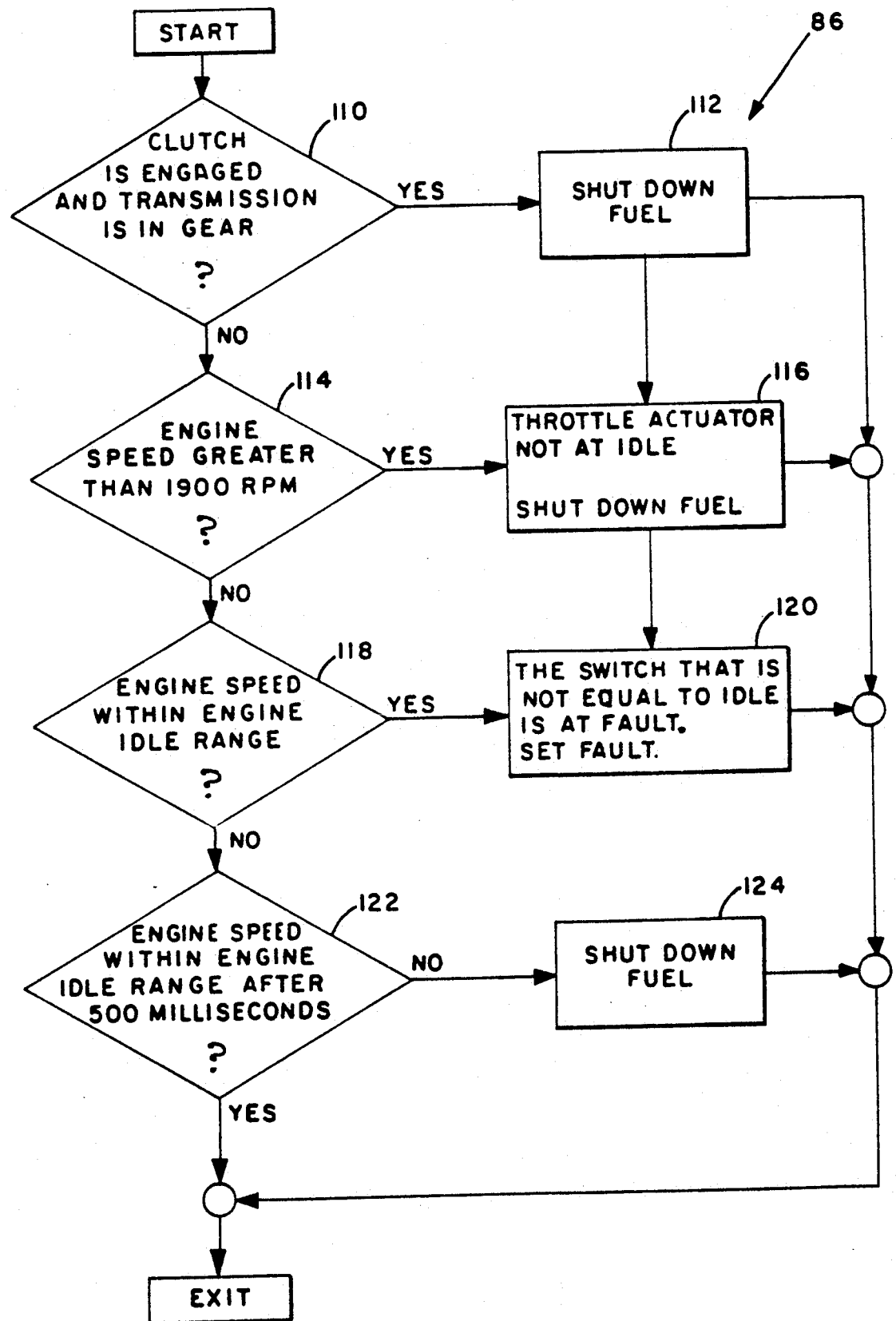
FIG. 5 is a chart of steps for determining what action to take when two feedback signals disagree.

When Feedback Signals Are Contradictory, FIG. 5

The two feedback devices that ordinarily provide information as to whether the throttle actuator 26A is at idle are a position feedback pot (signal 22C) and the idle safety switch (signal 22D). In an event in which one of those signals indicates that the throttle actuator 26A is at idle and other indicates that it is not, the safety subsystem attempts to determine which of the devices is providing correct information, and acts accordingly.

If the driveline is locked up (block 110), i.e., the clutch 16 is engaged and the transmission 12 is in gear, there is no easy way to ascertain which of the throttle actuator's differing feedback devices is correct. Therefore, the safest response is to stop the fuel to the engine (block 112). On the other hand, if the driveline is not locked up, an opportunity is available to ascertain something about the position of the throttle actuator by examining the engine speed (block 114).

If the engine speed 28 exceeds a first predetermined threshold value far above idle speed, such as 1900 rpm, it is apparent that the throttle actuator 26A is not at idle position. A fault is then declared and the fuel is shut off (block 116).

If the engine speed is below a second predetermined threshold value slightly above nominal idle (block 118), it is relatively safe to assume that the throttle actuator 26A has returned to the idle position. The fuel is left on, because there was only a false alarm. A fault is declared (block 120), identifying which of the feedback devices is providing false information.

The remaining case occurs when the engine speed is between the two threshold values just described. In that instance a further delay of 500 milliseconds is initiated (block 122) to insure that the engine has had sufficient time to respond. If, at the end of the 500-millisecond delay, the engine speed is still not within the idle range, the fuel is shut off (block 124).

Verifying Compliance With Throttle Commands. FIG. 6

It is desirable for the throttle actuator 26A accurately to track the commands (22A, 50) of the driver at settings other than idle; both of the throttle actuator's feedback device signals 22C, 22D are Periodically monitored to detect certain types of malfunctions When the throttle command 50 exceeds a predetermined relatively low threshold such as 25% of full demand, (see block 130), a series of tests are automatically Performed under control of the throttle control processor 42B. The tests are to ascertain whether the idle safety switch 26D is functioning properly and the throttle actuator 26A is faithfully tracking the command 50.

The two feedback signals 26C and 26D from the throttle actuator 26A are examined by the throttle control Processor 42B (block 132). If neither the idle safety switch 26D is indicating idle (by being closed), nor the feedback pot signal 26C is indicating idle, no corrective action is taken (134). If either signal does indicate idle (136), a 300-millisecond delay is interposed to give those feedback devices enough time to settle into correct Positions (block 138). If, at the end of the delay, either of the two feedback devices is still indicating idle, it is assumed that a malfunction has occurred, and a fault is declared (block 140).

In order to test whether the throttle actuator is correctly tracking the demand, the throttle feedback signal is compared with the throttle command when the accelerator pedal is not moving. If the throttle feedback signal exceeds the command by more than 10%, a 300-millisecond delay is initiated to give the throttle feedback signal time to come within that 10% range. If the throttle actuator does not come within 10% of command during that delay time a fault is declared. A simple figure illustrating the steps of this feature could be similar to the figures described above.

Scope of Invention

Although a fully automatic AMT system 10 is illustrated, the present invention is also applicable to semi-automatic AMT systems where the system automatically executes driver-selected gear changes.

Although the AMT system 10 has been described as utilizing a microprocessor-based control 42 and the methods and operations are carried out as software algorithms, it is clear that the operations can also be carried out in electronic or fluidic logic circuits comprising discrete hardware components.

Although the present invention has been set forth in terms of a particular preferred embodiment, various modifications including but not limited to those alluded to above are possible within the scope of the invention as claimed.

We claim:

1. For use in a vehicle having an accelerator (24A), a throttle, a fuel flow system, and an electronic control system (10); a method for insuring safety, comprising the steps of:
   providing a throttle command (22A, 42A, 70) for controlling the throttle;
   ascertaining (76) whether the throttle command substantially equals idle;
   sensing (80) whether the accelerator (24A) is at idle position and providing an accelerator idle signal (22B) accordingly;
   sensing (80) whether the throttle is at idle position and providing an idle safety signal (22D) accordingly;
   stopping the flow of the fuel system (26C, 84) if (a) the throttle command substantially equals idle and (b) the accelerator idle signal (22B) indicates nonidle, and (c) the idle safety signal (22C) indicates non-idle;
   but not stopping the flow of the fuel system if either: (d) said throttle command does not substantially equal idle; or (e) either one but not both of said accelerator idle signal and said idle safety signal is indicating idle.

2. For use in a vehicle having an accelerator 24A, a throttle, a fuel flow system, and an electronic control system (10), a method for insuring safety of the control system, comprising the steps of:
   providing a throttle command (22A, 42A, 70) for controlling the throttle;
   ascertaining (76) whether the throttle command substantially equals idle;
   sensing (80) whether the accelerator (24A) is at idle position and providing an accelerator idle signal (22B) accordingly;
   if (a) the throttle command substantially equals idle, providing a time delay (78);
   stopping the flow of the fuel system (26C, 84) if, after said time delay, (b) the accelerator idle signal (22B) indicates non-idle, and (c) the idle safety signal (22C) indicates non-idle;
   but not stopping the flow of the fuel system if any one or more of the following conditions is met:
   (d) said throttle command has not substantially equalled idle for longer than said predetermined time delay (78); or
   (e) both the accelerator idle signal and the idle safety signal indicate idle; or
   (f) both the accelerator idle signal and the idle safety signal indicate non-idle.

3. For use in a vehicle having an accelerator 24A, a throttle, a fuel flow system, and an electronic control system (10) including at least two control processors (42A, 42B), a method for insuring safety, comprising the steps of:
   sensing (56) whether said control processors are communicating and if not:
   sensing (58) whether the driver's foot is depressing the accelerator pedal (24A), and providing an accelerator idle signal (22B, 60) accordingly;
   providing a time delay (62) starting when said accelerator idle signal (22B) indicates that the accelerator pedal (24A) is not longer being depressed;
   sensing (64) whether the throttle is at idle position and providing an idle safety signal (22D) accordingly;
   stopping the flow of the fuel system (26C, 66) if, after said time delay, the idle safety signal (22D) indiates that the throttle is not at idle position;
   but not stopping the flow of the fuel system if either:
   (a) the accelerator idle signal indicates non-idle (58); or
   (b) said time delay (62) has not yet elapsed; or
   (c) after said time delay (62) has elapsed said idle safety signal indicates idle (68).

* * * * *